April 5, 1955

J. S. ROBBINS 2,705,625

BORING TYPE MINER

Filed Sept. 21, 1953

INVENTOR.
JAMES S. ROBBINS
BY
Murray G. Gleeson
ATTORNEY

April 5, 1955   J. S. ROBBINS   2,705,625
BORING TYPE MINER

Filed Sept. 21, 1953   3 Sheets-Sheet 2

INVENTOR.
JAMES S. ROBBINS
BY
Murray G. Gleeson
ATTORNEY

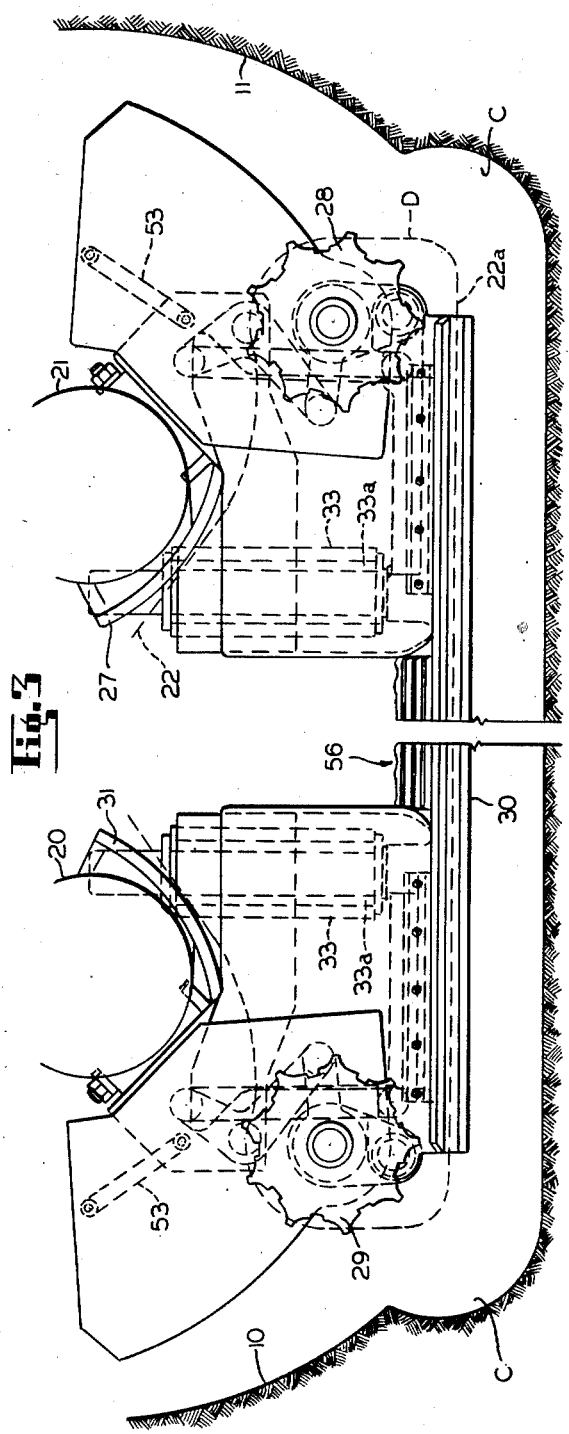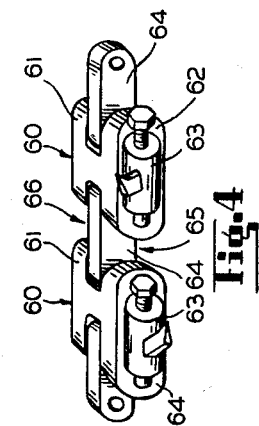

United States Patent Office 2,705,625
Patented Apr. 5, 1955

2,705,625

BORING TYPE MINER

James S. Robbins, Chicago, Ill., assignor to Goodman Manufacturing Company, Chicago, Ill., a corporation of Illinois Application September 21, 1953, Serial No. 381,378

6 Claims. (Cl. 262—9)

This invention relates to improvements in multiple boring mining machines of the kind known as the McKinlay type, wherein two radial boring bars are rotatable on parallel spaced axes to cut contiguous overlapping bores in advance of the machine.

Machines of the type above mentioned are usually provided with an auxiliary cutter chain, guided about cutter bars and sprockets to cut off the depending and upstanding cusps left at the roof and floor, respectively, by the two main bores. The bottom reach of the cutter chain along the floor is usually longer than the reach along the roof, so as to cut a kerf at the floor extending laterally beyond the maximum vertical diameters of the two main bores for the purpose of accommodating the endless tread tractors on which the mining machine is usually propelled. The cutter chain guides are vertically extensible and retractable to permit the cutter head to be raised from the floor and to facilitate tramming of the machine when not cutting. A machine of the general type above described is shown in the copending application of James S. Robbins bearing Serial Number 345,157, filed March 27, 1953.

One of the objects of the present invention is to provide means for extending or retracting the two end sprockets of the lower reach of the cutter chain in a horizontal, as well as a vertical, direction so as to provide additional clearance for rearward withdrawal of the cutter head, as well as for tramming the machine when not cutting.

A further object is to provide means cooperating with vertical extension or retraction mechanism for the cutter chain guide, for automatically extending or retracting the end sprockets of the cutter chain on a horizontal direction.

Another object of the invention is to provide guide or pusher plates, movable with the end sprockets and cooperating with other vertical extensible guide plates fixed on the machine frame, for guiding material dislodged by the cutter head toward the loading conveyor in the center of the machine, rather than permitting such dislodged material to accumulate on the floor in the path of the endless tractor treads of the machine.

Other objects of the invention will appear from time to time as the following description proceeds.

The invention may best be understood by reference to the accompanying drawings, in which:

Figure 3 is a view similar to Figure 2, but with the lower chain guide, end sprockets and pusher plates in contracted position; and Figure 4 is a detail perspective view of a portion of the cutter chain.

Figure 1:
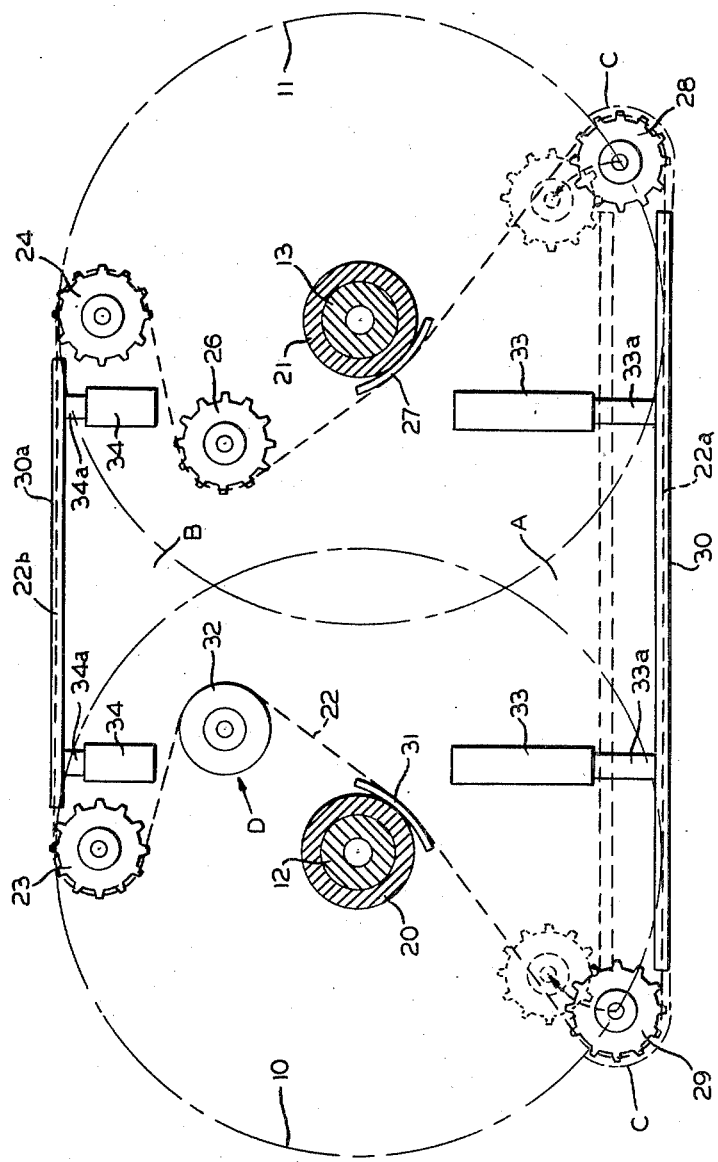
Figure 1 is a schematic diagram of a typical arrangement of cutter chain guide mechanism used in conjunction with the rotary boring arms of a McKinlay type mining machine, and indicating the manner in which the lower cutter bar and end sprockets are retracted from cutting position in accordance with my invention.

Referring to details of the embodiment of the invention shown in the drawings, Figure 1 is a schematic diagram, viewed from the front of a McKinlay type mining machine, wherein the arcuate lines 10, 11 represent the contiguous bores cut by the radial arms (not shown) which are arranged as usual to rotate in partially overlapping relation at the center of the machine. The radial arms are mounted on laterally spaced parallel shafts 12, 13, respectively, journalled in bearings shown at 20, 21.

A continuous cutter chain, indicated at 22, is trained as usual over suitable guides so that a lower reach 22a is directed along the mine floor to cut off the upstanding, generally triangular cusp, indicated at A, left on the floor between the two main bores 10, 11, and another upper reach 22b of the cutter bar is directed along the roof to cut off the depending cusp, indicated at B. As is conventional with machines of this type, the lower reach 22a of the cutter chain is extended laterally somewhat beyond the vertical center lines of the two bores, so as to cut out generally triangular areas, indicated at C, C, at the floor level to provide additional clearance to accommodate relatively wide endless tractor treads of the machine (not shown) on which these machines are usually propelled.

In the diagrammatic showing of Figure 1, the cutter chain 22 is trained about upper idler sprockets 23, 24 at opposite ends of the upper reach 22b, a driving sprocket 26 having suitable drive means (not shown) around a guide shoe 27 adjacent one of the boring shaft bearings 21, around bottom corner sprockets 28 and 29 at opposite ends of the lower reach 22a, from thence under a guide shoe 31 adjacent the other boring shaft bearing 20, and over a tensioning roller 32, normally urged as usual in the direction of the arrow D by suitable spring means (not shown).

As is also customary with machines of this type, the lower reach 22a of the cutter chain is guided along an elongated cutter bar 30 which is capable of being elevated or lowered by a pair of spaced double-acting cylinders 33, 33 mounted on the main frame with their pistons 33a, 33a connected near opposite ends of the cutter bar. The upper reach 22b has a similar, but shorter, cutter bar guide 30a elevated or lowered by cylinders 34 and pistons 34a. Figure 4 shows a form of cutter chain especially adapted for use with the type of machine shown and described herein, wherein cutter blocks 60 each have inner and outer portions 61, 62, with bit holders 63 on the outer portions thereof. Said blocks are pivotally connected by single links 64 intermediate the inner and outer portions so as to leave two rows of open spaces 65, 66 between opposite ends of each pair of adjacent cutter blocks, for engagement by the several drive and idler sprockets, each of which consists of a pair of axially-spaced toothed pinions. The inner portions 61 of the blocks are guided in an outwardly opening channel or guide shoe 31 along the lower cutter bar 30.

Referring now to one of the novel features of the present invention, means are provided for automatically retracting the bottom corner cutter chain sprockets 28 and 29 upwardly more than the cutter bar 30 and simultaneously swinging them inwardly toward each other, when the lower cutter bar 30 is elevated by cylinders 33, 33, so as to afford considerably greater clearance than heretofore for withdrawing the cutter head from the working face, and also to facilitate tramming of the machine.

A further novel feature, to be presently described in detail, is the provision of so-called pusher plates, cooperating with each of the lower corner sprockets in their simultaneous upward and inward contracting movements.

Figure 2:
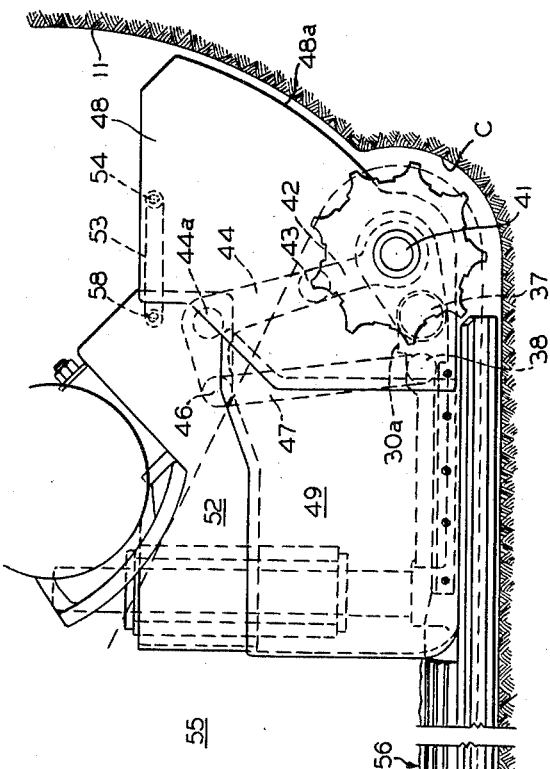
Figure 2 is a fragmentary enlarged front view showing the lower chain guide, end sprockets and pusher plates at the front end of the machine in expanded cutting position in the bore, but with the central portion of the chain guide broken away, and the cutter chain omitted.
Figure 2:
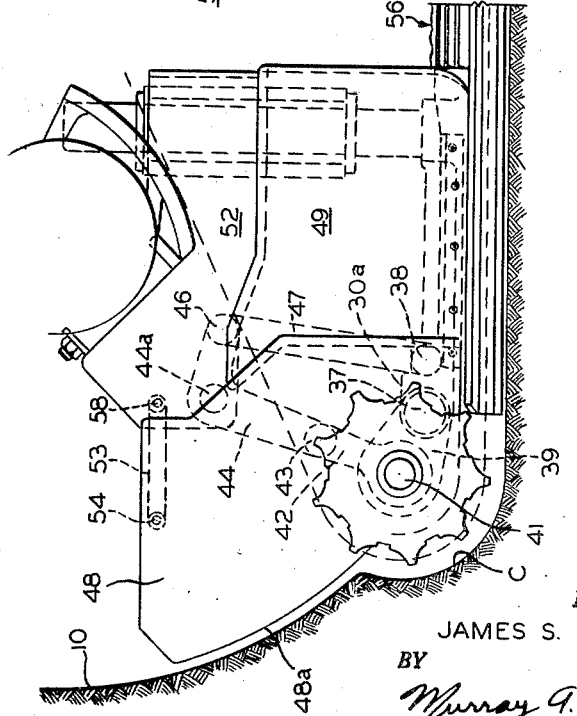

Referring first to the means for retracting the lower corner sprockets 28 and 29 when the lower cutter bar 30 is raised, it will be seen in Figure 2 that each end of the cutter bar has an upstanding bracket 30a with a pivot pin 37 extending transversely therethrough. Just inwardly of each pivot pin 37 on bracket 30a is a second pivot pin 38. Pivoted on each pin 37 is a link 39 having a shaft at its outer end on which one of the corner sprockets 28 or 29 for the lower reach 22a of the cutter chain is journalled.

Pivoted on the shaft 41 of each corner sprocket 28 or 29 is a link 42 which, in turn, is pivoted at 43 to one end of a bell crank 44 fulcrumed at 44a on the main frame of the machine on which the main boring shaft bearings 20 and 21 are also mounted. The other end of each bell crank lever 44 has a pivot pin 46 to which the upper end of a generally upright link 47 is pivoted. The lower end of link 47 is pivoted on pin 38 carried on the bracket 30a at the adjacent end of the cutter bar 30, as previously mentioned.

By reason of the two sets of linkages at each end of the lower cutter bar 30, as just described, it will be seen, by comparison of Figures 2 and 3, that, as said lower cutter bar is raised by the pistons 33a, 33a, the two corner sprockets 28 and 29 will be moved upwardly relative to the cutter bar and, at the same time, will be swung inwardly from their extended normal cutting position shown in Figure 2, to the position shown in Figure 3. It will be understood that such upward and inward movement of the corner sprockets will result in considerable slack in the cutter chain, which slack may be more than is ordinarily taken up by the tensioning roller 32 but, inasmuch as the cutter chain is not operating at such times, the presence of such slack is immaterial.

Referring now to the pusher plate feature of the invention, it will be seen from Figures 2 and 3 that the shaft 41 for each of the corner sprockets 28 and 29 also has the lower end of a pusher plate 48 journalled thereon, just behind its respective sprocket. Each pusher plate has its front face generally parallel to the plane of rotation of its corner sprocket, and extending upwardly therefrom with an arcuate outer edge 48a adapted to conform substantially with the limit of movement of the adjacent radial boring arm, so as to fit fairly closely within the lower portion of the bore formed by the latter when the cutter bar is lowered, and the adjacent corner sprocket is also lowered and in its fully extended cutting position of Figure 2. The function of each pusher plate is to prevent material dislodged from the working face from falling rearwardly where it will not be picked up by the gathering devices on the boring arms, or where it otherwise might fall into the path of the tractor treads.

The inner edge of each pusher plate 48 overlaps the outer edge of an upright parallel pusher plate 49 which is fixed along the upper edge of the cutter bar 30 and extends inwardly therealong toward an open throat 55 at the center of the machine into which the dislodged material is guided for removal by a conventional light conveyor, indicated at 56. The pusher plates 49, 49 on cutter bar 30 are, in turn, disposed in overlapping telescopic relation with parallel plates 52, 52 which are suitably fixed on the main frame on opposite sides of the throat 55 to close the space above the upper edges of the pusher plates 49 when the latter are in their extended position shown in Figure 2. The outer edges of the fixed pusher plates 52, 52 are also overlapped by the inner edges of the pusher plates 48, 48 as shown in Figures 2 and 3. The arrangement is such that, when the cutter bar 30 is raised, the plates 49, 49 carried thereon will be raised therewith in telescopic relation with the fixed plates 52, 52 on the machine and, simultaneously, the outer pusher plates 48, 48, together with their respective corner sprockets 28 and 29, will be swung upwardly and inwardly in overlapping telescopic relation with both plates 49 and 52 with the aid of an additional linkage arrangement, herein consisting of a link 53 pivoted at 54 to the upper edge of each pusher plate 48 and at 58 to the outer edge of the adjacent fixed plate 52.

Although I have shown and described certain embodiments of my invention, it will be understood that I do not wish to be limited to the detailed features shown and described, but that various modifications may be made without departing from the spirit and scope of the invention, as defined in the following claims.

I claim:

1. In a multiple boring machine having a frame, a pair of radial boring bars rotatable on generally horizontal parallel axes for cutting contiguous overlapping bores in advance of said frame, a horizontally disposed cutter chain guide adjustable vertically of said frame rearwardly of the paths of rotation of said bars between a floor level approximately tangential to the maximum vertical diameters of said bars to positions substantially above said floor level, and an endless cutter chain trained along said guide, the improvement which consists in mounting a pair of sprocket wheels for the cutter chain on linkages connected to and adjustable vertically with the opposite ends of said cutter bar, said linkages also being interconnected with the frame to swing their respective sprocket wheels automatically into an extended generally tangentially aligned position beyond the ends of said cutter bar when the latter is in its lowered floor level position, and to swing said sprockets upwardly and inwardly relative to the ends of said cutter bar when the latter is raised above its floor level position.

2. The structure in accordance with claim 1, wherein each linkage for mounting a chain sprocket at one end of the cutter chain guide consists of a generally outwardly extending link pivoted on the chain guide and on the sprocket, a bell crank lever pivotally mounted on the main frame, a generally upright link pivotally connecting the outwardly extending link to one arm of said bell crank lever, and another generally upright link pivotally connecting the other arm of said bell crank lever to the adjacent end of the cutter chain guide.

3. The structure of claim 1, wherein an upright pusher plate wing is also pivotally supported on the axis of each chain sprocket for swinging movement with the latter.

4. The structure of claim 3, wherein guide means connects the pusher plate with the frame, for controlling the upward and inward movement of the pusher plate in a predetermined path.

5. The structure of claim 3, wherein other pusher plate means is mounted on and movable vertically with the cutter chain guide, and the pusher plate wings at opposite ends of the cutter bar are telescopically engaged for sliding movement relative to the pusher plate means on the cutter chain guide.

6. The structure in accordance with claim 5, wherein still other upright pusher plate means is fixed on the frame, and both the pusher plate means on the cutter chain guide and the pusher plate wings movable with the sprockets are telescopically engaged for sliding movement relative to said fixed pusher plate means.

No references cited.